(12) United States Patent
Wang et al.

(10) Patent No.: US 12,698,371 B2
(45) Date of Patent: Aug. 4, 2026

(54) BIAXIALLY ORIENTED FILM

(71) Applicant: BOREALIS AG, Vienna (AT)

(72) Inventors: Jingbo Wang, Linz (AT); Friedrich Berger, Linz (AT); Juulia Hirvonen, Porvoo (FI); Arnaud Alabrune, Courbevoie (FR); Elisabeth Potter, Linz (AT); Tuan Anh Tran, Linz (AT)

(73) Assignee: BOREALIS AG, Vienna (AT)

( * ) Notice: Subject to any disclaimer, the term of this patent is extended or adjusted under 35 U.S.C. 154(b) by 226 days.

(21) Appl. No.: 18/693,849

(22) PCT Filed: Sep. 21, 2022

(86) PCT No.: PCT/EP2022/076225
§ 371 (c)(1),
(2) Date: Mar. 20, 2024

(87) PCT Pub. No.: WO2023/046754
PCT Pub. Date: Mar. 30, 2023

(65) Prior Publication Data

US 2024/0384047 A1 Nov. 21, 2024

(30) Foreign Application Priority Data

Sep. 21, 2021 (EP) ..................................... 21197986

(51) Int. Cl.
C08J 5/18 (2006.01)
(52) U.S. Cl.
CPC ............. C08J 5/18 (2013.01); *C08J 2323/08* (2013.01)
(58) Field of Classification Search
CPC .......... B32B 27/32; C08F 10/00; C08F 10/02; C08F 110/00; C08F 110/02; C08F 210/00; C08F 210/02; C08F 210/16; C08L 23/00; C08L 23/02; C08L 23/04; C08L 23/06; C08L 23/08
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,582,816 A | 4/1986 | Miro | |
| 5,391,654 A | 2/1995 | Ahvenainen et al. | |
| 5,885,721 A | 3/1999 | Su et al. | |
| 6,689,857 B1 * | 2/2004 | Larter | C08J 5/18 |
| | | | 428/307.3 |
| 2009/0035546 A1 | 2/2009 | McLeod | |
| 2016/0083488 A1 * | 3/2016 | Buryak | C08L 23/0815 |
| | | | 526/348 |

FOREIGN PATENT DOCUMENTS

| | | | | |
|---|---|---|---|---|
| EP | 0479186 A2 | 4/1992 | | |
| EP | 0688794 B1 | 8/1998 | | |
| EP | 0891990 A2 | 1/1999 | | |
| EP | 1310295 A1 | 5/2003 | | |
| EP | 1415999 A1 | 5/2004 | | |
| EP | 0810235 B1 | 11/2004 | | |
| EP | 1378528 B1 | 4/2005 | | |
| EP | 1591460 A1 | 11/2005 | | |
| EP | 2994506 B1 | 7/2017 | | |
| EP | 2583998 B1 * | 2/2018 | ............. | C08L 23/04 |
| EP | 3335874 A1 | 6/2018 | | |
| EP | 3554828 B1 | 9/2020 | | |
| WO | 1996018662 A1 | 6/1996 | | |
| WO | 1996019503 A1 | 6/1996 | | |
| WO | 1996032420 A1 | 10/1996 | | |
| WO | 1997044371 A1 | 11/1997 | | |
| WO | 1998014491 A1 | 4/1998 | | |
| WO | 1999051646 A1 | 10/1999 | | |
| WO | 2000040407 A1 | 7/2000 | | |
| WO | 2001055230 A1 | 8/2001 | | |

(Continued)

OTHER PUBLICATIONS

International Search Report and Written Opinion in Application No. PCT/EP2022/076225, mailed Jan. 10, 2023, 10 pages.
B. Hagstrom, Conference on Polymer Processing (The Polymer Processing Society), Extended Abstracts and Final Programme, Gothenburg, Aug. 19 to 21, 1997, 4:13.
Klimke K et al. Optimisation and Application of Polyolefin Branch Quantification by melt-State 13C NMR spectroscopy, Macromol. Chem. Phys. 2006;207:382-395.
Parkinson M et al. Effect of Branch Length on 13C NMR Relaxation Properties in Molten Ply[ethylene-co-(alpha-olefin)] Model Systems, Macromol. Chem. Phys. 2007;208:2128.

(Continued)

*Primary Examiner* — Zachary M Davis
(74) *Attorney, Agent, or Firm* — Meunier Carlin & Curfman LLC

(57) ABSTRACT

The invention provides a biaxially oriented film comprising a multimodal high density polyethylene (HDPE), wherein the multimodal HDPE has a density determined according to ISO 1183 in the range of 952 to 968 kg/m$^3$ and an MFR2 of 0.3 to 3.0 g/10) min when measured at 190° C. with a load of 2.16 kg according to ISO 1133, and wherein the multimodal HDPE comprises at least two fractions: (C) 30 to 70 wt % relative to the total weight of the multimodal HDPE, of a lower molecular weight fraction being a polyethylene with a density in the range of 955 to 980 kg/m$^3$ and an MFR2 of 100 to 2000 g/10 min when measured at 190° C. with a load of 2.16 kg according to ISO 1133; and (D) 30 to 70 wt % relative to the total weight of the multimodal HDPE, of a higher molecular weight fraction being a polyethylene with a density in the range of 925 to 970 kg/m$^3$ and an MFR2 of 0.0001 to 1.0 g/10 min when measured at 190° C. with a load of 2.16 kg according to ISO 1133.

16 Claims, No Drawings

(56)                  References Cited

FOREIGN PATENT DOCUMENTS

| WO | 2005/118655 A1 | 12/2005 |
| WO | 2007/025640 A1 | 3/2007 |
| WO | 2013029223 A1 | 3/2013 |
| WO | 2014042898 A2 | 3/2014 |
| WO | 2014/096296 A1 | 6/2014 |
| WO | 2016/097193 A1 | 6/2016 |
| WO | 2020001191 A1 | 1/2020 |
| WO | 2020087433 A1 | 5/2020 |
| WO | 2020/257411 A1 | 12/2020 |
| WO | 2021011576 A1 | 1/2021 |
| WO | 2021079255 A1 | 4/2021 |

OTHER PUBLICATIONS

Pollard M et al. Observation of Chain Brnaching n Polyethylene in the Solid State and Melt via 13C NMR Spectroscopy and melt NMR Relaxation Time Measurements, Macromolecules 2004;37:813.

Filip X et al. Heteronuclear decoupling under fast MAS by a rotor-synchornized Hahn-echo pulse train, J. Mag. Resn. 2005, 176, 239.

Griffin JM et al. Low-load rotor-synchonised Hahn-echo pulse train (RS-HEPT) 1H decoupling in solid-state NMR: factors affecting MAS spin-echo dephasing times, Mag. Res. in Chem. 2007 45, S1, S198.

Castignolles P et al. Detection and quantification of branching in polyacrylates by size-exclusion chromatography (SEC) and melt-state 13C NMR spectroscopy, Polymer 50 (2009) 2373.

Busico V et al. Microsctructure of polypropylene, Prog. Polym. Sci. 26 (2001) 443.

Busico V et al. Full assignment of the 13C NMR spectra of regioregular polypropylenes: Methyl and methylene region, Macromoleucles 30 (1997) 6251.

Zhou Z et al. A new decoupling method for accurate quantification of polyethylene copolymer composition and triad sequence distribution with 13C NMR, J. Mag. Reson. 187 (2007) 225.

Busico V et al. Alk-1-ene polymerization in the presence of a monocyclopentadienyl zirconium (IV) acetamidinate catalyst: microstructural and mecahnistic insights, Macromol. Rapid Commun. 2007, 28, 1128.

Resconi L et al. Selectivity in propene polymerization with metallocene catalysts, Chem. Rev. 2000, 100, 1253.

* cited by examiner

BIAXIALLY ORIENTED FILM

This invention relates to a biaxially oriented film with beneficial mechanical and processing properties. In particular, the invention relates to a biaxially oriented film comprising a bimodal high density polyethylene with improved properties. The invention further relates to laminates comprising the film and to the use of the bimodal high density polyethylene in the production of biaxially oriented films.

BACKGROUND OF INVENTION

Polymer films are widely used in packaging. These films must obviously protect the contents of the package from damage and the environment.

Polyethylene films are widely used in packaging and are often laminated with a relatively high heat resistant substrate like PET film to prepare a flexible package. However, such laminates cannot be readily recycled due to the presence of two chemically different materials.

To resolve that problem a machine direction oriented polyethylene (MDO PE) or biaxially oriented polyethylene (BOPE) film can be used to replace the PET film. HDPE offers a good alternative to PET in terms of stiffness and thermal resistance. The resulting laminate comprises polyethylene only and is hence fully mechanically recycled.

Biaxial orientation of polyolefin films is a well-known and well established technology. The polymer requires stiffness at elevated temperature otherwise the film will break. A downside of the ability to withstand the elevated temperature stretching procedure is however, that biaxially oriented films made from HDPE result in very stiff and at the same time brittle, opaque, hazy and/or matt films.

There is thus a need to produce films which show better stiffness, together with good impact and optical properties. It is further desired that the films show these improved mechanical properties regardless of the orientation of the films. That means films should provide good mechanical properties in both the machine (MD) and transverse direction (TD). Isotropic behaviour of stiffness and low shrinkage is also attractive.

The need to provide such biaxially oriented films with well-balanced mechanical and optical properties as well as low and isotropic shrinkage behaviour is also triggered by the desire to provide monomaterial packaging solutions which meet the increasing demand on easy recyclability.

WO 98/14491 describes a biaxially oriented film of high density polyethylene. The HDPE may have a density of 0.940 or higher and a melt index in the range of 0.5 to 10 g/10 min. HDPE blends are envisaged, which are stated to advantageously include a major proportion of an HDPE having a melt index of 0.5 to 2 g/10 min. U.S. Pat. No. 5,885,721 contains a similar disclosure.

WO 2020/257411 discloses a multilayer film comprising a core layer which contains at least 50 wt % of an HDPE and outer layers comprising ethylene-propylene polymers.

The present inventors have unexpectedly found that a biaxially oriented film comprising a particular class of bimodal high density polyethylene (HDPE) possesses an attractive balance of stiffness and haze.

SUMMARY OF INVENTION

Viewed from one aspect the invention provides a biaxially oriented film comprising a multimodal high density polyethylene (HDPE), wherein the multimodal HDPE has a density in the range of 952 to 968 kg/m³ determined according to ISO 1183 and an $MFR_2$ of 0.3 to 3.0 g/10 min when measured at 190° C. with a load of 2.16 kg according to ISO 1133, and wherein the multimodal HDPE comprises at least two fractions:

(A) 30 to 70 wt % relative to the total weight of the multimodal HDPE, of a lower molecular weight fraction being a polyethylene with a density in the range of 955 to 980 kg/m³ and an $MFR_2$ of 100 to 2000 g/10 min when measured at 190° C. with a load of 2.16 kg according to ISO 1133; and (B) 30 to 70 wt % relative to the total weight of the multimodal HDPE, of a higher molecular weight fraction being a polyethylene with a density in the range of 925 to 970 kg/m³ and an $MFR_2$ of 0.0001 to 1.0 g/10 min when measured at 190° C. with a load of 2.16 kg according to ISO 1133.

Viewed from a second aspect, the invention provides a laminated film structure comprising a biaxially oriented film as hereinbefore defined laminated to a substrate.

Viewed from a further aspect, the invention provides the use of a multimodal HDPE having a density in the range of 952 to 968 kg/m³ determined according to ISO 1183 and an $MFR_2$ of 0.3 to 3.0 g/10 min when measured at 190° C. with a load of 2.16 kg according to ISO 1133, and wherein the multimodal HDPE comprises at least two fractions:

A. 30 to 70 wt % relative to the total weight of the multimodal HDPE, of a lower molecular weight fraction being a polyethylene with a density in the range of 955 to 980 kg/m³ and an $MFR_2$ of 100 to 2000 g/10 min when measured at 190° C. with a load of 2.16 kg according to ISO 1133; and B. 30 to 70 wt % relative to the total weight of the multimodal HDPE, of a higher molecular weight fraction being a polyethylene with a density in the range of 925 to 970 kg/m³ and an $MFR_2$ of 0.0001 to 1.0 g/10 min when measured at 190° C. with a load of 2.16 kg according to ISO 1133 in the production of a biaxially oriented film as hereinbefore defined.

DETAILED DESCRIPTION

Multimodal High Density Polyethylene

It has been found that the multimodal high density polyethylene polymer according to the invention provides an improved material for biaxially oriented film applications, which combines very good mechanical properties e.g. in terms of tensile modulus, with excellent optical properties e.g. in terms of haze.

The polymer of the invention is a multimodal high density ethylene polymer (HDPE). The HDPE may be a homopolymer or a copolymer, but is preferably an ethylene copolymer. By ethylene copolymer is meant a polymer the majority by weight of which derives from ethylene monomer units (i.e. at least 50 wt % ethylene relative to the total weight of the copolymer). The comonomer contribution preferably is up to 10% by mol, more preferably up to 5% by mol. Ideally however there are very low levels of comonomer present in the polymers of the present invention such as 0.1 to 2.0 mol %, e.g. 0.1 to 1.0 mol %.

The other copolymerisable monomer or monomers are preferably C3-12, especially C3-10, alpha olefin comonomers, particularly singly or multiply ethylenically unsaturated comonomers, in particular C3-10-alpha olefins such as propene, but-1-ene, hex-1-ene, oct-1-ene, and 4-methylpent-1-ene. The use of 1-hexene, 1-octene and 1-butene, or mixtures thereof, is particularly preferred, especially 1-hex-
ene and 1-butene. Ideally there is only one comonomer
present.

The polymer of the invention is multimodal and therefore
comprises at least two components. The polymer is prefer-
ably bimodal. The polymer of the invention most preferably
comprises
  (A) a lower molecular weight ethylene homopolymer
      component, and
  (B) a higher molecular weight ethylene copolymer com-
      ponent.

The HDPE of the invention is multimodal. Usually, a
polyethylene composition comprising at least two polyeth-
ylene fractions, which have been produced under different
polymerisation conditions resulting in different (weight
average) molecular weights and molecular weight distribu-
tions for the fractions, is referred to as "multimodal".
Accordingly, in this sense the compositions of the invention
are multimodal polyethylenes. The prefix "multi" relates to
the number of different polymer fractions the composition is
consisting of. The polyethylene may also be multimodal
with respect to comonomer content.

The form of the molecular weight distribution curve, i.e.
the appearance of the graph of the polymer weight fraction
as a function of its molecular weight, of such a multimodal
polyethylene will show two or more maxima or at least be
distinctly broadened in comparison with the curves for the
individual fractions.

For example, if a polymer is produced in a sequential
multistage process, utilising reactors coupled in series and
using different conditions in each reactor, the polymer
fractions produced in the different reactors will each have
their own molecular weight distribution and weight average
molecular weight. When the molecular weight distribution
curve of such a polymer is recorded, the individual curves
from these fractions are superimposed into the molecular
weight distribution curve for the total resulting polymer
product, usually yielding a curve with two or more distinct
maxima.

The HDPE of the invention has an $MFR_2$ of 0.3 to 3.0
g/10 min. Preferable ranges for $MFR_2$ are 0.4 to 2.5 g/10
min, such as 0.5 to 2.0 g/10 min.

The HDPE of the invention preferably has an $MFR_{21}$ of
15 to 80 g/10 min, such as 20 to 75 g/10 min, most
preferably 30 to 65 g/10 min.

The HDPE of the invention preferably has a Flow Rate
Ratio (FRR) of the $MFR_{21}/MFR_2$ of at least 25.0, like at
least 35.0, more preferably at least 45.0 Furthermore, poly-
mer of the invention preferably has a Flow Rate Ratio (FRR)
of the $MFR_{21}/MFR_2$ of up to 80.0, like up to 75.0, more
preferably up to 70.0.

The density of the polymer is in the range 952 to 968
kg/m³ determined according to ISO 1183 The polymers of
the invention are therefore high density polyethylenes,
HDPE. Preferably, the polymer has a density of 953 to 965
kg/m³ or more, more preferably 954 to 963 kg/m³, such as
955 to 961 954 to 960 kg/m³.

The HDPE of the invention preferably has a molecular
weight distribution (MWD) in the range 7 to 30, such as 10
to 20.

The HDPE of the invention comprises at least a lower
molecular weight component (A) and a higher molecular
weight component (B). In one particularly preferable
embodiment, the HDPE consists of components (A) and (B).
The weight ratio of fraction (A) to fraction (B) in the
composition is in the range 30:70 to 70:30, more preferably
35:65 to 65:35, most preferably 40:60 to 60:40. In some embodiments the ratio may be 35 to 50 wt % of fraction (A)
and 50 to 65 wt % fraction (B), such as 40 to 50 wt % of
fraction (A) and 50 to 60 wt % fraction (B), wherein the wt
% values are relative to the total weight of the multimodal
HDPE.

In a particularly preferred embodiment, the wt % values
for fractions (A) and (B) add up to 100%.

Each of Fraction (A) and Fraction (B) may be an ethylene
homopolymer or an ethylene copolymer. By ethylene
homopolymer is meant a polymer comprising at least 97 mol
% (such as at least 98 mol %, especially at least 99.5 mol %)
ethylene monomer units. The term "ethylene copolymer" is
defined above. Most preferably, fraction (A) is an ethylene
homopolymer and fraction (B) is an ethylene copolymer.

The HDPE of the invention is produced in a multistage
process wherein fractions (A) and (B) are produced in
subsequent stages. In such a case, the properties of the
fractions produced in the second step (or further steps) of the
multistage process can either be inferred from polymers
which are separately produced in a single stage by applying
identical polymerisation conditions (e.g. identical tempera-
ture, partial pressures of the reactants/diluents, suspension
medium, reaction time) with regard to the stage of the
multistage process in which the fraction is produced, and by
using a catalyst on which no previously produced polymer
is present. Alternatively, the properties of the fractions
produced in a higher stage of the multistage process may
also be calculated, e.g. in accordance with B. Hagström,
Conference on Polymer Processing (The Polymer Process-
ing Society), Extended Abstracts and Final Programme,
Gothenburg, Aug. 19 to 21, 1997, 4:13. Thus, although not
directly measurable on the multistage process products, the
properties of the fractions produced in higher stages of such
a multistage process can be determined by applying either or
both of the above methods. The skilled person will be able
to select the appropriate method.

Polymer HDPEs produced in a multistage process are also
designated as "in-situ" blends. The resulting end product
consists of an intimate mixture of the polymers from the two
or more reactors, the different molecular-weight-distribution
curves of these polymers together forming a molecular-
weight-distribution curve having a broad maximum or two
or more maxima, i.e. the end product is a multimodal
polymer mixture The lower molecular weight fraction (A) has an $MFR_2$ of
100 to 2000 g/10 min, preferably of 125 to 1500 g/10 min,
more preferably 150 to 1000 g/10 min, such as 200 to 750
g/10 min.

Fraction (A) has a density of 955 to 980 kg/m³, preferably
960 to 978 kg/m³, such as 965 to 975 kg/m³.

Fraction (A) can be an ethylene homopolymer or copo-
lymer. Preferably, Fraction (A) is an ethylene homopolymer.

The higher molecular weight fraction (B) has an $MFR_2$ of
0.0001 to 1.0 g/10 min, preferably of 0.0005 to 0.5 g/10 min,
more preferably 0.0008 to 0.1 g/10 min, such as 0.001 to
0.05 g/10 min.

Fraction (B) has a density of 925 to 970 kg/m³, preferably
930 to 960 kg/m³, such as 935 to 950 kg/m³.

Fraction (B) can be an ethylene homopolymer or copo-
lymer. Fraction (B) is preferably a copolymer. Preferred
ethylene copolymers employ alpha-olefins (e.g. C3-12
alpha-olefins) as comonomers. Examples of suitable alpha-
olefins include but-1-ene, hex-1-ene and oct-1-ene. But-1-
ene is an especially preferred comonomer.

Preparation of Multimodal HDPE

The multimodal HDPE may be produced by polymerisa-
tion using conditions which create a multimodal (e.g.

bimodal) polymer product ideally using a Ziegler Natta catalyst system. Typically, a two or more stage, i.e. multi-stage, polymerisation process is used with different process conditions in the different stages or zones (e.g. different temperatures, pressures, polymerisation media, hydrogen partial pressures, etc). Preferably, the multimodal (e.g. bimodal) composition is produced by a multistage polymerisation, e.g. using a series of reactors, with optional comonomer addition preferably in only the reactor(s) used for production of the higher/highest molecular weight component(s). A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc. (see for example WO97/44371 and WO96/18662).

Preferably, the multimodal HDPE is a bimodal HDPE prepared in a two-stage polymerisation process.

The first polymerisation stage produces an ethylene homopolymer or an ethylene copolymer, typically an ethylene homopolymer, which is subsequently fed to the second polymerisation stage. The second polymerisation stage can produce a further ethylene homopolymer, or an ethylene copolymer, preferably an ethylene copolymer.

The first polymerisation stage is preferably a slurry polymerization step.

The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amounts of methane, ethane and/or butane.

The ethylene content in the fluid phase of the slurry may be from 1 to 50% by mole, preferably from 2 to 20% by mole and in particular from 2 to 10% by mole. The benefit of having a high ethylene concentration is that the productivity of the catalyst is increased but the drawback is that more ethylene then needs to be recycled than if the concentration was lower.

The temperature in the first polymerisation stage is typically from 60 to 100° C., preferably from 70 to 90° C. An excessively high temperature should be avoided to prevent partial dissolution of the polymer into the diluent and the fouling of the reactor. The pressure is generally from 1 to 150 bar, preferably from 40 to 80 bar.

The slurry polymerisation may be conducted in any known reactor used for slurry polymerization. Such reactors include a continuous stirred tank reactor and a loop reactor. It is especially preferred to conduct the slurry polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654. It is thus preferred to conduct the first polymerization stage as a slurry polymerisation in a loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, U.S. Pat. Nos. 3,374,211, 3,242, 150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerisation stage continuously.

Hydrogen is typically introduced into the first polymerisation stage for controlling the $MFR_2$ of the resultant polymer. The amount of hydrogen needed to reach the desired MFR depends on the catalyst used and the polymerisation conditions. The desired polymer properties may be obtained in slurry polymerisation in a loop reactor with the molar ratio of hydrogen to ethylene of from 100 to 1000 mol/kmol (or mol/1000 mol) and preferably of from 200 to 800 mol/kmol.

The average residence time in the first polymerisation stage is typically from 20 to 120 minutes, preferably from 30 to 80 minutes. As it is well known in the art the average residence time $\tau$ can be calculated from Equation 1 below:

Residence Time $$\tau = \frac{V_R}{Q_o} \qquad \text{Equation 1}$$

Where $V_R$ is the volume of the reaction space (in case of a loop reactor, the volume of the reactor, in case of the fluidized bed reactor, the volume of the fluidized bed) and $Q_o$ is the volumetric flow rate of the product stream (including the polymer product and the fluid reaction mixture).

The production rate is suitably controlled with the catalyst feed rate. It is also possible to influence the production rate by suitable selection of the monomer concentration. The desired monomer concentration can then be achieved by suitably adjusting the ethylene feed rate.

In the second polymerisation stage, ethylene is polymerised, optionally together with at least one alpha-olefin comonomer, in the presence of the catalyst and the ethylene polymer produced in the first polymerisation stage. It will thus be appreciated that the second polymerisation stage generates an ethylene polymer, which combines with the ethylene polymer from the first polymerisation stage, to form the multimodal HDPE of the invention. Preferable comonomers are discussed hereinbefore, however it is noted that it is particularly preferable if the at least one alpha-olefin is butene.

The second polymerisation stage is preferably a gas phase polymerisation step, i.e. carried out in a gas-phase reactor. Any suitable gas phase reactor known in the art may be used, such as a fluidised bed gas phase reactor.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

A chain transfer agent (e.g. hydrogen) is typically added to the third polymerisation stage, preferably in amounts of 50 to 500 mol of H$_2$/kmol ethylene.

The split between the first polymerisation stage and the second polymerisation stage (i.e. between the slurry polymerisation and the gas phase polymerisation) is typically 30:70 to 70:30, more preferably 35:65 to 65:35, most preferably 40:60 to 60:40.

Prepolymerization

The polymerization steps discussed above may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is understood within the scope of the invention, that the amount of polymer produced in the prepolymerization typically lies within 1-5 wt % in respect to the final multimodal HDPE.

Catalyst

The polymerization is typically conducted in the presence of a Ziegler-Natta polymerization catalyst. Suitable Ziegler- Natta (ZN) catalysts generally comprise at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), optionally a compound of group 13 of the Periodic Table (IUPAC), and optionally an internal organic compound, like an internal electron donor. A ZN catalyst may also comprise further catalyst component(s), such as a cocatalyst and optionally external additives.

Suitable ZN catalysts preferably contain a magnesium compound, an aluminium compound and a titanium compound supported on a particulate support.

The particulate support can be an inorganic oxide support, such as silica, alumina, titania, silica-alumina, silica-titania or a MgCl$_2$ based support. Preferably, the support is silica or a MgCl$_2$ based support.

Particularly preferred Ziegler-Natta catalysts are such as described in EP 1378528 A1.

If used, the magnesium compound preferably is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is a chlorine containing aluminium alkyl. Especially preferred compounds are aluminium alkyl dichlorides and aluminium alkyl sesquichlorides.

The transition metal compound of Group 4 to 6 is preferably a titanium or vanadium compound, more preferably a halogen containing titanium compound, most preferably chlorine containing titanium compound. An especially preferred titanium compound is titanium tetrachloride.

The catalyst can be prepared by sequentially contacting the carrier with the above mentioned compounds, as described in EP 688794 or WO 99/51646. Alternatively, it can be prepared by first preparing a solution from the components and then contacting the solution with a carrier, as described in WO 01/55230.

Another group of suitable ZN catalysts contain a titanium compound together with a magnesium halide compound acting as a support. Thus, the catalyst contains a titanium compound and optionally a Group 13 compound for example an aluminium compound on a magnesium dihalide, like magnesium dichloride. Such catalysts are disclosed, for instance, in WO 2005/118655, EP 810235, WO 2014/096296 and WO 2016/097193.

Suitable activators are group 13 metal compounds, typically group 13 alkyl compounds and especially aluminium alkyl compounds, where the alkyl group contains 1 to 16 C-atoms. These compounds include trialkyl aluminium compounds, such as trimethylaluminium, triethylaluminium, tri-isobutylaluminium, trihexylaluminium and tri-n-octylaluminium, alkyl aluminium halides, such as ethyl-aluminium dichloride, diethylaluminium chloride, ethylaluminium sesquichloride, dimethylaluminium chloride and the like. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

An optional internal organic compound may be chosen from the following classes: ethers, esters, amines, ketones, alcohols, anhydrides or nitriles or mixtures thereof. Preferably, the optional internal organic compound is selected from ethers and esters, most preferably from ethers. Preferred ethers are of 2 to 20 carbon-atoms and especially mono, di or multi cyclic saturated or unsaturated ethers comprising 3 to 6 ring atoms. Typical cyclic ethers suitable in the present invention, if used, are tetrahydrofuran (THF), substituted THF, like 2-methyl THF, di-cyclic ethers, like 2,2-di(2-tetrahydrofuryl)propane, 2,2-di-(2-furan)-propane, or isomers or mixtures thereof. Internal organic compounds are also often called as internal electron donors.

In the production of the multimodal HDPE of the present invention, preferably a compounding step is applied, wherein the composition of the base resin, i.e. the blend, which is typically obtained as a base resin powder from the reactor, is extruded in an extruder and then pelletised to polymer pellets in a manner known in the art.

The multimodal HDPE may also contain minor quantities of additives such as pigments, nucleating agents, antistatic agents, fillers, antioxidants, etc., generally in amounts of up to 10% by weight, preferably up to 5% by weight.

Optionally, additives or other polymer components can be added to the multimodal HDPE during the compounding step in the amount as described above. Preferably, the multimodal HDPE of the invention obtained from the reactor is compounded in the extruder together with additives in a manner known in the art.

Film

The film of the invention is a biaxially oriented film. The biaxially oriented films of the present invention can have a thickness in the range of 5.0-100 μm, such as 10.0-75.0 μm, like 15.0-50 μm or 20.0-40.0 μm.

The biaxially oriented films of the present invention show good optical properties in view of haze transparency when measured according to ASTM D1003. The haze is typically 9.0% or lower such as 8.0 or 5.0% or lower. The haze may be in the range of 0.5 to 9.0, preferably 1.0 to 8.0, more preferably 1.5 to 5.0, such 1.5 to 4.0. Preferably the measurements for haze are done 20 μm films.

Further, it is preferred that the film has a tensile modulus (TM) determined according to ISO 527-3 on 20 μm films in machine direction (MD) of at least 1000 MPa to 4000 MPa, more preferably in the range of 1500 to 3000 MPa, still more preferably in the range of 2000 to 2500 MPa.

The films may have a TM/Haze ratio of >115, preferably >120, more preferably >200, such as >300. A typical upper limit for the TM/Haze ratio is 2000, such as 1500, e.g. 1000.

The films of the invention ideally have a stretch ratio in the machine direction (MD) and/or transverse direction (TD) of more than 5.0 times, preferably at least 6.0 times, such as at least 7.0 times.

In one embodiment of the invention, the films consist essentially of the multimodal HDPE. The term consists essentially of means that the polymer of the invention is the only "non additive" polyolefin present. It will be appreciated however that such a polymer may contain standard polymer additives some of which might be supported on a polyolefin (a so called masterbatch as is well known in the art). The term consists essentially of does not exclude the presence of such a supported additive.

In an alternative embodiment, the multimodal HDPE of the present invention can be blended with other polymers in the biaxially oriented films of the invention.

It is preferred if the biaxially oriented film of the present invention comprises between 1.0 and 100 wt.-% of the multimodal HDPE. In a preferred alternative, the film may comprise at least 30.0, or at least 50.0 wt.-% or at least 70.0 wt.-% of the multimodal HDPE. It is further preferred that such films comprise the multimodal HDPE in ranges of 30.0-99.0 wt.-%, such as 50.0-98.0 or 70.0-90.0 wt %, relative to the total weight of the film.

If other polymers are present, it is preferred if any other polymer is a polyethylene. Thus, in a preferred embodiment, the biaxially oriented articles of the present invention are characterised by being free of any polymers other than polyethylenes. Suitable polyethylenes that can be mixed include HDPE, MDPE, LLDPE, LDPE and ethylene based plastomers and elastomers.

In one embodiment, the film further comprises 1 to 30 wt %, preferably 5 to 25 wt %, such as 10 to 20 wt %, relative to the total weight of the film, of a second HDPE which is different to the multimodal HDPE of the invention. In this embodiment, the film typically comprises 70 to 99 wt %, preferably 75 to 95 wt %, such as 80 to 90 wt %, relative to the total weight of the film, of the multimodal HDPE of the invention.

Preferably this second HDPE has a density of 955 to 985 kg/m$^3$ determined according to ISO1183, more preferably 957 to 980 kg/m$^3$, such as 960 to 970 kg/m$^3$.

Preferably, the second HDPE has an MFR$_2$ of 5 to 100 g/10 min, more preferably 8 to 60 g/10 min, such as 10 to 50 g/10 min.

The second HDPE may be a homopolymer or a copolymer, but is preferably an ethylene copolymer. The other copolymerisable monomer or monomers are preferably C3-12, especially C3-10, alpha olefin comonomers, particularly singly or multiply ethylenically unsaturated comonomers, in particular C3-10-alpha olefins such as propene, but-1-ene, hex-1-ene, oct-1-ene, and 4-methyl-pent-1-ene. The use of 1-hexene, 1-octene and 1-butene, or mixtures thereof, is particularly preferred, especially 1-hexene and 1-butene. Ideally there is only one comonomer present.

The second HDPE of the invention may be unimodal or multimodal.

The biaxially oriented films of the present invention may contain usual polymer additives, such as slip agents, UV-stabilisers, pigments, antioxidants, nucleating agents and so on. These additives may be carried on a carrier polymer in the form of a masterbatch.

For the avoidance of doubt, it is envisaged that usual polymer additives, e.g. as described above may be present even when the film, (or even a film layer) "consists" of the multimodal HDPE. The term "consists of" is not intended therefore to exclude the presence of polymer additives. It does however exclude the presence of other polymer components for blending with the HDPE. If a carrier polymer is used as part of a masterbatch, that is not excluded however. Articles may be free of any other mixing polymers but may still comprise minor amounts of carrier polymer used for masterbatches.

The biaxially oriented films of the present invention can be monolayer films or multilayer films. Multilayer films may comprise 2 or more layers, such as 3, 5, 7 or more layers. Preferably, the film is a monolayer film.

If the biaxially oriented film is a multilayer film, the multimodal HDPE may be present in a core layer or in any outer layer. In a preferred embodiment, the biaxially oriented film of the present invention is a multilayer film having a core and one or more adjacent layers (e.g. two outer layers), wherein the core layer comprises the multimodal HDPE and the outer layers comprise low melting polyethylene grades (e.g. LLDPE) which have low density, and are suitable for good sealing behaviour. Suitable outer layers can comprise LLDPE, LDPE or other polyethylene grades, such as elastomers or plastomers preferably having a density of at most 929 $kg/m^3$, such as 860 to 925 $kg/m^3$, such as 875-920 $kg/m^3$. The person skilled is well aware what materials can be used as sealing layers.

The multimodal HDPE of the invention may form at least 1.0 wt % of the layer in film in which it is present. It is preferred that a layer within the biaxially oriented film comprises between 1.0 and 100 wt.-% of the multimodal HDPE, such as at least 30.0 wt %, or at least 50.0 wt % or at least 70.0 wt.-% of the multimodal HDPE. It is further preferred that a layer of a film comprises the multimodal HDPE in ranges of 30.0-98.0 wt.-%, such as 50.0-95.0 or 70.0-85.0 wt %. The layer may consist of the HDPE.

In case the biaxially oriented film of the present invention is a multilayer film, the layer distribution should be as such that the layer comprising the multimodal HDPE forms a major part of the film structure and the sealing layers form a minor part. Possible layer distributions may be outer layer 1.0-25.0%, core layer 50.0-98.0%, outer layer 1.0-25.0%, wherein the percentages are seen in relation to the total thickness of the film. It is preferred, that each of the outer layers forms 3.0-20.0%, such as 4.0-15.0% or 5.0-10.0% of the total thickness of the film, and the core layer preferably has 60.0-94.0%, preferably 70-92%, such as 80-90% of the total film thickness.

The multilayer films of the present invention can be symmetric (with both outer layers having the same thickness, or asymmetric (with just one outer layer or with two or more outer layers differing in view of their thickness.

The biaxially oriented films of the present invention can be laminated to other substrates to form a laminated structure. Suitable substrates include but are not limited to, biaxially oriented polypropylene film, oriented PET film, oriented polyamide film, blown and cast PE film, aluminum foil and paper. In particular, the substrate to which the biaxial film of the invention is laminated is preferably a polyethylene film. In this way, the entire laminate is formed from polyethylene based polymers.

It is preferred if the laminate is formed from a mono or multilayer biaxial film as defined herein and a substrate layer, such as a polyethylene substrate layer. That substrate layer is most especially a polyethylene blown film such as one comprising HDPE, MDPE, LLDPE, LDPE and ethylene based plastomers and elastomers.

In any such laminate, there is preferably one film layer based on the biaxially oriented film of the invention. Such a biaxially oriented film layer within a laminated structure can have a thickness in the range of 5.0-100 µm, such as 10.0-75.0 µm, like 15.0-50 µm or 20.0-40.0 µm. The substrate layer may have a thickness of 5.0-100 µm, such as 10.0-75.0 µm, like 15.0-50 µm or 20.0-40.0 µm.

The biaxially oriented films or laminates of the present invention may be used for the production of packaging articles like bags, pouches, labels or lids, or other technical applications like banknotes. The biaxially oriented films or laminates of the present invention are preferably used for applications related to food packaging.

The manufacture of biaxially oriented films is well known (e.g. chapter 2 and 3 in Biaxial stretching of film: principles and applications, edited by Mark T. DeMeuse, Woodhead Publishing, 2011). The person skilled in the art can apply his knowledge of BOPP film production to the manufacture of the BOPE films of the invention. The films of the invention may be manufactured by any known technology, such as the double bubble, tenter frame or spontaneous process.

In a typical process, the components of the film are initially mixed and melted within an extruder. The temperature within the extruder is conventional and will be sufficient to ensure melting of the components. The extrudate is cast to form a cast film (or flat film) which is then cooled. The film should ideally be cooled to a temperature of less than 50° C. before any reheating process is begun. The film is then reheated and stretching is begun. The temperature during the stretching phase can vary and may decrease as the stretching process continues. The reheat temperature in step d) is defined as the temperature at the start of the stretching process. Once stretching in the machine direction is complete, the film is annealed. This maintains the MDO film structure for the TD stretch. Reheating for the second stretching phase is carried out and again, the temperature can vary during the stretching phase. The reheat temperature in step g) is defined therefore as the temperature at the start of the second stretch procedure. Finally, the film is allowed to cool.

The present invention will now be described in further detail by the examples provided below:

The following definitions of terms and determination methods apply for the above general description of the invention as well as to the below examples unless otherwise defined.

Determination Methods

Melt Flow Rate (MFR)

The melt flow rates are measured at 190° C. with a load of 2.16 kg ($MFR_2$) or 21.6 kg ($MFR_{21}$) according to ISO 1133

Calculation of $MFR_2$ of Fractions (A) and (B)

$$\log A = x \cdot \log B + (1 - x) \cdot \log C$$

$$C = 10^{\wedge \frac{(\log A - x.\log B)}{(1-x)}}$$

B=$MFR_2$ of Fraction (A)
C=$MFR_2$ of Fraction (B)
A=final $MFR_2$ (mixture) of multimodal polyethylene copolymer (P)
X=weight fraction of Fraction (A)

Flow Rate Ratio (FRR21/2))

FRR is determined as the ratio between the $MFR_{21}$ and the $MFR_2$.

GPC

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:

2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \tag{1}$$

$$M_w = \frac{\sum_{i=1}^{N} (A_i x M_i)}{\sum_{i=1}^{N} A_i} \tag{2}$$

$$M_Z = \frac{\sum_{i=1}^{N} (A_i x M_i^2)}{\sum_{i=1}^{N} (A_i x M_i)} \tag{3}$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS} = 19 \times 10^{-3} \text{ mL/g}, \alpha_{PS} = 0.655$$

$$K_{PE} = 39 \times 10^{-3} \text{ mL/g}, \alpha_{PE} = 0.725$$

$$K_{PP} = 19 \times 10^{-3} \text{ mL/g}, \alpha_{PP} = 0.725$$

A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Comonomer Contents

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {klimke06, parkinson07, castignolles09} Standard single-pulse excitation was employed utilising the NOE at short recycle delays {pollard04, klimke06} and the RS-HEPT decoupling scheme {fillip05,griffin07}. A total of 1024 (1 k) transients were acquired per spectra. Quantitative $^{13}C\{^1H\}$ NMR spectra were processed, integrated and relevant quantitative properties determined from the integrals. All chemical shifts are internally referenced to the bulk methylene signal ($\delta+$) at 30.00 ppm.

The amount of ethylene was quantified using the integral of the methylene ($\delta+$) sites at 30.00 ppm accounting for the number of reporting sites per monomer:

$$E = I_{\delta+}/2$$

the presence of isolated comonomer units is corrected for based on the number of isolated comonomer units present:

$$Etotal = E + (3 * B + 2 * H)/2$$

where B and H are defined for their respective comonomers. Correction for consecutive and non-consecutive commoner incorporation, when present, is undertaken in a similar way. Characteristic signals corresponding to the incorporation of 1-butene were observed and the comonomer fraction calculated as the fraction of 1-butene in the polymer with respect to all monomer in the polymer:

$$fBtotal = (Btotal/(Etotal + Btotal + Htotal)$$

The amount isolated 1-butene incorporated in EEBEE sequences was quantified using the integral of the *B2 sites at 38.3 ppm accounting for the number of reporting sites per comonomer:

$$B = I_{*B2}$$

The amount consecutively incorporated 1-butene in EEBBEE sequences was quantified using the integral of the $\alpha\alpha B2B2$ site at 39.4 ppm accounting for the number of reporting sites per comonomer:

$$BB = 2 * I\alpha\alpha B2B2$$

The amount non consecutively incorporated 1-butene in EEBEBEE sequences was quantified using the integral of the $\beta\beta B2B2$ site at 24.7 ppm accounting for the number of reporting sites per comonomer:

$$BEB = 2 * I\beta\beta B2B2$$

Due to the overlap of the *B2 and *βB2B2 sites of isolated (EEBEE) and non-consecutively incorporated (EEBEBEE) 1-butene respectively the total amount of isolated 1-butene incorporation is corrected based on the amount of non-consecutive 1-butene present:

$$B = I_{*B2} - 2 * I_{\beta\beta B2B2}$$

The total 1-butene content was calculated based on the sum of isolated, consecutive and non consecutively incorporated 1-butene:

$$Btotal = B + BB + BEB$$

The total mole fraction of 1-butene in the polymer was then calculated as:

$$fB = (Btotal/(Etotal + Btotal + Htotal))$$

Characteristic signals corresponding to the incorporation of 1-hexene were observed and the comonomer fraction calculated as the fraction of 1-hexene in the polymer with respect to all monomer in the polymer:

$$fHtotal = (Htotal/(Etotal + Btotal + Htotal))$$

The amount isolated 1-hexene incorporated in EEHEE sequences was quantified using the integral of the *B4 sites at 39.9 ppm accounting for the number of reporting sites per comonomer:

$$H = I_{*B4}$$

The amount consecutively incorporated 1-hexene in EEHHEE sequences was quantified using the integral of the ααB4B4 site at 40.5 ppm accounting for the number of reporting sites per comonomer:

$$HH = 2 * I\alpha\alpha B4B4$$

The amount non consecutively incorporated 1-hexene in EEHEHEE sequences was quantified using the integral of the ββB4B4 site at 24.7 ppm accounting for the number of reporting sites per comonomer:

$$HEH = 2 * I\beta\beta B4B4$$

The total mole fraction of 1-hexene in the polymer was then calculated as:

$$fH = (Htotal/(Etotal + Btotal + Htotal))$$

The mole percent comonomer incorporation is calculated from the mole fraction:

$$B[\text{mol \%}] = 100 * fB$$

$$H[\text{mol \%}] = 100 * fH$$

The weight percent comonomer incorporation is calculated from the mole fraction:

$$B[\text{wt \%}] =$$
$$100 * (fB * 56.11)/((fB * 56.11) + (fH * 84.16) + ((1 - (fB + fH)) * 28.05))$$

$$H[\text{wt \%}] =$$
$$100 * (fH * 84.16)/((fB * 56.11) + (fH * 84.16) + ((1 - (fB + fH)) * 28.05))$$

REFERENCES

Klimke, K., Parkinson, M., Piel, C., Kaminsky, W., Spiess, H.W., Wilhelm, M., Macromol. Chem. Phys. 2006; 207:382.

Parkinson, M., Klimke, K., Spiess, H.W., Wilhelm, M., Macromol. Chem. Phys. 2007; 208:2128.

Pollard, M., Klimke, K., Graf, R., Spiess, H.W., Wilhelm, M., Sperber, O., Piel, C., Kaminsky, W., Macromolecules 2004; 37:813.

Filip, X., Tripon, C., Filip, C., J. Mag. Resn. 2005, 176, 239

Griffin, J.M., Tripon, C., Samoson, A., Filip, C., and Brown, S.P., Mag. Res. in Chem. 2007 45, S1, S198

Castignolles, P., Graf, R., Parkinson, M., Wilhelm, M., Gaborieau, M., Polymer 50 (2009) 2373

Busico, V., Cipullo, R., Prog. Polym. Sci. 26 (2001) 443

Busico, V., Cipullo, R., Monaco, G., Vacatello, M., Segre, A.L., Macromoleucles 30 (1997) 6251

Zhou, Z., Kuemmerle, R., Qiu, X., Redwine, D., Cong, R., Taha, A., Baugh, D. Winniford, B., J. Mag. Reson. 187 (2007) 225

Busico, V., Carbonniere, P., Cipullo, R., Pellecchia, R., Severn, J., Talarico, G., Macromol. Rapid Commun. 2007, 28, 1128

Resconi, L., Cavallo, L., Fait, A., Piemontesi, F., Chem. Rev. 2000, 100, 1253

Density

The density was measured according to ISO 1183 and ISO1872-2 for sample preparation.

Tensile Modulus

Tensile modulus was measured in machine and/or transverse direction according to ISO 527-3 on film samples prepared as described under the Film Sample preparation with film thickness of 20 µm and at a cross head speed of 1 mm/min for the modulus.

Haze

Haze as a measure for the optical appearance of the films was determined according to ASTM D1003 on film samples with a thickness of 20 µm.

EXAMPLES

Materials

CE1: a unimodal HDPE produced with Lynx 200 catalyst supplied by Grace Catalysts Technologies in a pilot plant, with a configuration of prepolymerisation and loop, it is pelletized with 500 ppm Irganox 1010 (supplied by BASF), 2000 ppm Irgafos 168 (supplied by BASF), 500 ppm Calciumstearat (CEASIT FI, supplied by Baerlocher) on a twin screw extruder. It has final $MFR_2$ 0.94 g/10 min, density 962 kg/m$^3$.

CE2: a bimodal HDPE produced with a ZN catalyst (as disclosed in EP 2994506) in a pilot plant, with a configuration of prepolymerisation-loop-gas phase reactor, having MFR 1.4 g/10 min, density 944 kg/m$^3$. It is pelletized with same recipe as CE1.

IE1: a bimodal HDPE produced using the same ZN catalyst as for CE2, in a pilot plant, with a configuration of prepolymerisation-loop-gas phase reactor, having MFR 0.8 g/10 min, density 955.5 kg/m$^3$. It is pelletized with same recipe as CE1.

IE2: IE2 is 80 wt % of IE1+20 wt % of CG9620. This blend has MFR 1.4 g/10 min, density 958 kg/m$^3$. CG9620 is a unimodal HDPE with a density of 962 kg/m$^3$, $MFR_2$ of 12 g/10 min and is (commercially available HDPE from Borealis A/S).

Table 1 shows the typical polymerisation parameters and final polymer properties for CE1, CE2 and IE1.

TABLE 1

| | CE1 | CE2 | IE1 |
|---|---|---|---|
| Prepoly | | | |
| Temp. (° C.) | 60 | 85 | 70 |
| Press. (kPa) | 5475 | 5475 | 5700 |
| H2 (g/h) | 5.0 | 5.0 | 5.0 |
| Loop reactor | | | |
| Temp. (° C.) | 95 | 95 | 95 |
| Press. (kPa) | 5188 | 5493 | 5500 |
| C2 conc. (mol-%) | 4.2 | 4.9 | 3.5 |
| H2/C2 (mol/kmol) | 91.2 | 386.0 | 430.0 |
| Density | 960.0 | 970.0 | 970.0 |
| split % | 100.0 | 45.1 | 49.0 |
| MFR2 (g/10 min) | 0.97 | 360.00 | 350.00 |
| GPR | | | |
| Temp. (° C.) | Not in use | 85 | 85 |
| Press. (kPa) | | 2000 | 2000 |
| H2/C2 (mol/kmol) | | 62 | 110 |
| C4/C2 (mol/kmol) | | 273.0 | 25.0 |
| split % | — | 54.9 | 51.0 |
| Density (kg/m3) | | 943.4 | 955.5 |
| MFR2 (g/10 min) | | 1.40 | 0.80 |
| Pellet | | | |
| Density (kg/m3) | 962.3 | 943.4 | 955.5 |
| MFR2 (g/10 min) | 0.94 | 1.44 | 0.8 |
| MFR21 (g/10 min) | 33.76 | 81.6 | 47.35 |
| MFR21/MFR2 | 35.9 | 56.7 | 59.2 |
| TM | 1031 | 624 | 950 |
| MFR in GPR | n.a. | 0.015 | 0.002 |
| Density in GPR | n.a. | 922.8 | 941.6 |

Film Preparation

Biaxially oriented films from IE1, IE2 and CE2 were prepared on a Karo 4 lab scale stretch facility. Sheet before stretching was made from as lab scale cast line, with a chill roll temperature of 70° C. The initial sheet thickness was controlled according to the maximum stretch ratio to reach the final film thickness of 20 μm. To produce a 20 μm film with a stretch ratio of 6.0 to 6.0, the initial film had a thickness of 720 μm. The stretch conditions, such as preheating time and stretch temperature are tuned by a person skilled in the art.

Properties of the films are shown in Table 2. Due to the unimodal nature of CE1, the stretch ratio is very low and therefore no films were prepared. CE2 is a bimodal medium density PE, it has good stretch behaviour, however, due to its lower density the modulus is low, haze is relative good. As can be seen, the IEs have excellent stiffness and lower haze than CE2, even though both of them have higher density. The IEs gives excellent stiffness and optical balance, as reflected by the ratio of Tensile Modulus/Haze, when both properties were determined on 20 μm thick samples

TABLE 2

| | CE2 | IE1 | IE2 |
|---|---|---|---|
| Stretching Ratio | 6.0 × 6.0 | 7.0 × 7.0 | 6.5 × 6.5 |
| Haze (%) | 9.7 | 2.9 | 3.4 |
| Tensile modulus (MPa) | 1076 | 2034 | 2215 |
| Tensile Modulus/Haze | 111 | 701 | 605 |

The invention claimed is:

1. A biaxially oriented film comprising a multimodal high density polyethylene (HDPE), wherein the multimodal HDPE has a density determined according to ISO 1183 in the range of 952 to 968 kg/m$^3$ and an $MFR_2$ of 0.3 to 3.0 g/10 min when measured at 190° C. with a load of 2.16 kg according to ISO 1133, and wherein the multimodal HDPE comprises at least two fractions:

(A) 30 to 70 wt %, relative to the total weight of the multimodal HDPE, of a lower molecular weight fraction being a polyethylene with a density in the range of 955 to 980 kg/m$^3$ and an $MFR_2$ of 100 to 2000 g/10 min when measured at 190° C. with a load of 2.16 kg according to ISO 1133; and (B) 30 to 70 wt %, relative to the total weight of the multimodal HDPE, of a higher molecular weight fraction being a polyethylene with a density in the range of 925 to 970 kg/m$^3$ and an $MFR_2$ of 0.0001 to 1.0 g/10 min when measured at 190° C. with a load of 2.16 kg according to ISO 1133;

and wherein said biaxially oriented film is a monolayer film.

2. The biaxially oriented film as claimed in claim 1, wherein fraction (A) is present in an amount of 35 to 50 wt %, relative to the total weight of the multimodal HDPE.

3. The biaxially oriented film as claimed in claim 1, wherein fraction (B) is present in an amount of 50 to 65 wt %, relative to the total weight of the multimodal HDPE.

4. The biaxially oriented film as claimed in claim 1, wherein the multimodal HDPE is bimodal and consists of fractions (A) and (B).

5. The biaxially oriented film as claimed in claim 1, wherein the lower molecular weight fraction (A) is an ethylene homopolymer.

6. The biaxially oriented film as claimed in claim 1, wherein the higher molecular weight fraction (B) is an ethylene copolymer with at least one alpha-olefin comonomer.

7. The biaxially oriented film as claimed in claim 1, wherein said film further comprises 1 to 30 wt %, relative to the total weight of the film, of an HDPE with a density in the range of 955 to 985 kg/m$^3$ and an MFR$_2$ of 5 to 100 g/10 min when measured at 190° C. with a load of 2.16 kg according to ISO 1133, and which is different to the multimodal HDPE.

8. The biaxially oriented film as claimed in claim 1, wherein said film has a tensile modulus (TM), determined according to ISO 527-3 on 20 μm films in the machine direction (MD) of at least 1000 MPa to 4000 MPa.

9. The biaxially oriented film as claimed in claim 1, wherein said film has a haze measured according to ASTM D1003 of 0.5 to 9.0%.

10. The biaxially oriented film as claimed in claim 1, wherein said film has a TM/Haze ratio of >115 to 2000.

11. A laminated film structure comprising the biaxially oriented film as defined in claim 1 laminated to a substrate.

12. The laminated film structure as claimed in claim 11 wherein the structure consists of polyethylene polymers only.

13. A method of use of a multimodal HDPE having a density in the range of 952 to 968 kg/m$^3$ determined according to ISO 1183 and an MFR$_2$ of 0.3 to 3.0 g/10 min when measured at 190° C. with a load of 2.16 kg according to ISO 1133, and wherein the multimodal HDPE comprises at least two fractions:

A. 30 to 70 wt %, relative to the total weight of the multimodal HDPE, of a lower molecular weight fraction being a polyethylene with a density in the range of 955 to 980 kg/m$^3$ and an MFR$_2$ of 100 to 2000 g/10 min when measured at 190° C. with a load of 2.16 kg according to ISO 1133; and B. 30 to 70 wt %, relative to the total weight of the multimodal HDPE, of a higher molecular weight fraction being a polyethylene with a density in the range of 925 to 970 kg/m$^3$ and an MFR$_2$ of 0.0001 to 1.0 g/10 min when measured at 190° C. with a load of 2.16 kg according to ISO 1133;

wherein the method comprises using the multimodal HDPE in the production of the biaxially oriented film as claimed claim 1, wherein said biaxially oriented film is a monolayer film.

14. The biaxially oriented film as claimed in claim 1, wherein fraction (A) is present in an amount of 40 to 50 wt %, relative to the total weight of the multimodal HDPE.

15. The biaxially oriented film as claimed in claim 1, wherein fraction (B) is present in an amount of 50 to 60 wt %, relative to the total weight of the multimodal HDPE.

16. The biaxially oriented film as claimed in claim 6, wherein the at least one alpha-olefin comonomer comprises butene.

\* \* \* \* \*